United States Patent
Mayer, Jr. et al.

(10) Patent No.: US 6,819,867 B2
(45) Date of Patent: Nov. 16, 2004

(54) HAND-HELD REMOTE CONTROL AND DISPLAY SYSTEM FOR FILM AND VIDEO CAMERAS AND LENSES

(75) Inventors: Albert L. Mayer, Jr., Woodland Hills, CA (US); Boon Yong, Los Angeles, CA (US); Brian Dang, Woodland Hills, CA (US); Zhen Zhou, Woodland Hills, CA (US)

(73) Assignee: Panavision, Inc., Woodland Hills, CA (US)

( * ) Notice: Subject to any disclaimer, the term of this patent is extended or adjusted under 35 U.S.C. 154(b) by 0 days.

(21) Appl. No.: 10/159,933

(22) Filed: May 29, 2002

(65) Prior Publication Data

US 2003/0025802 A1 Feb. 6, 2003

Related U.S. Application Data (60) Provisional application No. 60/294,482, filed on May 30, 2001.

(51) Int. Cl.[7] .............................................. G03B 17/00
(52) U.S. Cl. ...................... 396/56; 352/179; 348/211.4; 348/211.8
(58) Field of Search ...................... 396/56–59; 352/131, 352/178, 179; 348/211.99, 211.1, 211.2, 211.4, 211.8, 211.9, 211.11

(56) References Cited

U.S. PATENT DOCUMENTS

| | | | |
|---|---|---|---|
| 4,420,773 A | * 12/1983 | Toyoda et al. ............... 386/118 |
| 4,837,817 A | *  6/1989 | Maemori ................. 348/211.4 |
| 5,012,335 A |    4/1991 | Cohodar ..................... 358/108 |
| 5,014,080 A |    5/1991 | Miyadera .................... 354/403 |
| 5,073,790 A |   12/1991 | Ogawa ........................ 354/400 |
| 5,146,071 A |    9/1992 | Ookubo et al. |
| 5,220,848 A |    6/1993 | Basilico ................. 74/471 XY |
| 5,223,867 A |    6/1993 | Nguyen-Nhu ............... 352/180 |
| 5,371,633 A |   12/1994 | Kawamura et al. ......... 359/739 |
| 5,517,300 A |    5/1996 | Parker et al. .......... 356/139.06 |
| 5,561,686 A |   10/1996 | Kobayashi et al. ......... 375/200 |
| 5,570,177 A |   10/1996 | Parker et al. .......... 356/139.06 |
| 5,666,159 A |    9/1997 | Parulski et al. ............. 345/211 |
| 5,719,622 A |    2/1998 | Conway ..................... 348/211 |
| 6,148,151 A |   11/2000 | Bauer .......................... 396/56 |
| 6,161,933 A |   12/2000 | Tschida et al. .............. 352/179 |
| 6,393,216 B1 | * 5/2002 | Ootsuka et al. ............... 396/56 |

FOREIGN PATENT DOCUMENTS

| | | | |
|---|---|---|---|
| DE | 42 20 129 A1 | * | 12/1993 |
| EP | 0 574 105 A1 | * |  6/1993 |
| JP |    4-42673   | * |  1/1992 |

* cited by examiner

*Primary Examiner*—David M. Gray
(74) *Attorney, Agent, or Firm*—Morrison & Foerster LLP (57) ABSTRACT

A system (30) for remotely controlling the operation of a camera (10) having a video signal tap and a lens having lens focus, zoom and T-stop adjustment motors (24, 26, 28). A digital motor driver unit (32) is connected to and controls the camera and the lens motors. A portable digital controller (34) has either a hardwire (36) or wireless connection to the motor driver unit and is sized for holding in one hand. The controller has separate controls (52, 62, 66, 70) that are manually adjustable for controlling the motor driver unit to separately and independently control the camera and the lens motors. The controller also has a display screen (56) for selectively displaying a scene from the video signal tap of the camera or data from the lens motors. The system includes a memory and processing means for selective operation with a plurality of different cameras and lenses and to calibrate the lenses to the controller and motor driver unit.

37 Claims, 6 Drawing Sheets

| SET SPEED | 24.00 FPS |
|---|---|
| SET SHUTTER | 180.00 DEG |
| FOOTAGE | 150 FT |
| OPERATION | NORMAL |
| EXIT | |
| SETUP | | fig. 21

| | LO | HI |
|---|---|---|
| SET SPEED | 06.00 | 24.00 |
| SHUTTER | 90.00 | 180.00 |
| T-STOP | 5.6 | 4.0 |
| RAMP TIME | 5 | |
| SCRN TIME | 6 | |
| FOOTAGE | | 150 FT |
| OPERATION | | RAMP |
| EXIT | | | fig. 22

HAND-HELD REMOTE CONTROL AND DISPLAY SYSTEM FOR FILM AND VIDEO CAMERAS AND LENSES

CROSS-REFERENCE TO RELATED APPLICATION

Priority is claimed from Provisional Application Ser. No. 60/294,482, filed May 30, 2001.

BACKGROUND OF THE INVENTION

This invention relates to a remote control system for a camera, either film or video, and its objective lens for professional photography to produce theatre-quality movies and other productions requiring precise and variable lens and camera control.

In the filming or video taping of movies and other high quality productions, it is often necessary or desirable to use more than one camera for recording a scene from different positions simultaneously. Often one or more of those cameras is located in an inaccessible or inconvenient location, such as on a crane or moving dolly where it is difficult to have persons operating all of the camera and lens controls, such as lens focus and zoom, even if a cameraman is there for aiming the camera. While there have been systems for remotely controlling some of the functions of cameras and lenses under such conditions, those prior art controls have been unsatisfactory in various respects, such as inaccuracies in lens adjustments, delays in responses to control commands, incomplete information feedback to the operator and the like. Further, heretofore such remote systems did not provide the operator with a handheld control unit with a screen for selectively displaying the scene as actually viewed by the camera being remotely controlled.

BRIEF SUMMARY OF THE INVENTION

The principle object of the present invention is to provide a novel remote control system for cine cameras and lenses that overcomes the deficiencies of the prior art systems.

Another object of this invention is to provide a remote control system for cine cameras and lenses wherein the operator's portable control unit includes a screen on which camera/lens data and a video picture of the actual scene being recorded may be selectively displayed. A more detailed object is to provide such a system wherein the screen can selectively display scenes from more than one camera.

Still another object of the present invention is to provide a remote control system and apparatus that may be used with any motion camera and objective lens therefor regardless of the manufacturer, size or type of camera or lens. More specifically, the control system and apparatus of the present invention is particularly suited for film cameras and lenses that have a variety of adjustments, such as film speed, shutter angle, T-stop (iris), focus, zoom, zoom speed, ramp speed using T-stop (iris) and/or shutter angle, depth of field shifts, and the like.

Other and more detailed objects of the present invention will appear to those skilled in the art from the drawings and detailed description of a preferred embodiment set forth below.

DETAILED DESCRIPTION OF A PREFERRED EMBODIMENTS OF THE INVENTION

Figure 1:
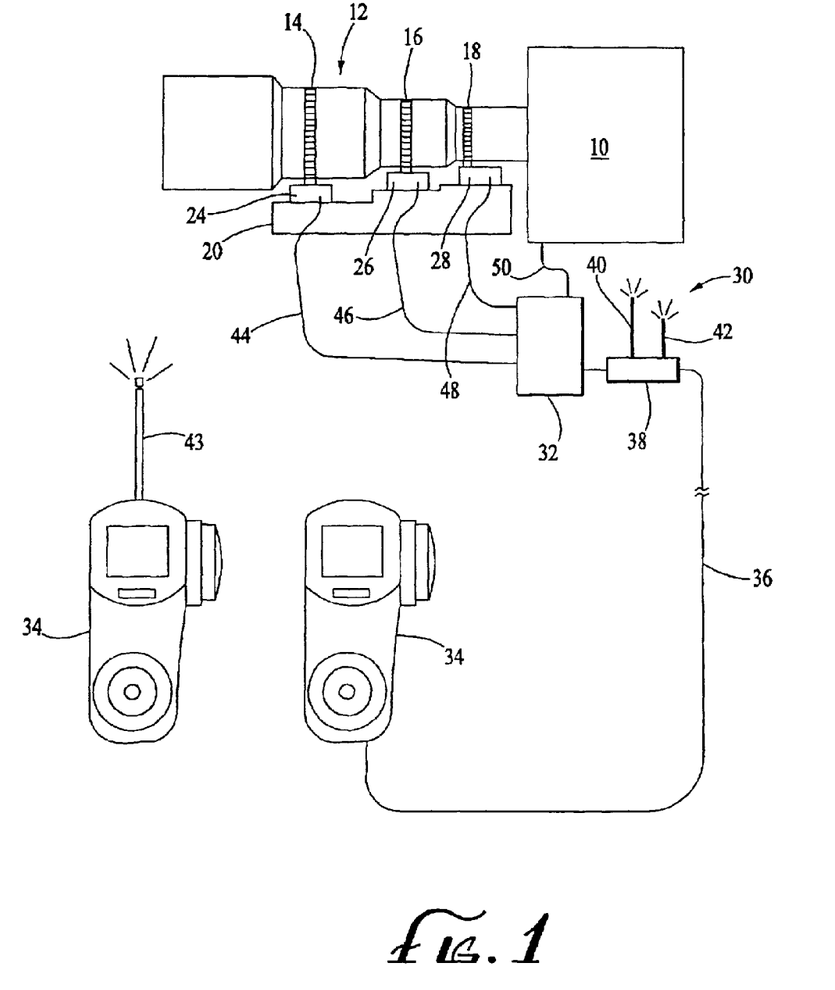
FIG. 1 is a diagrammatical illustration of a cine camera with a zoom lens and the remote control system of the present invention for controlling that camera and lens.
Figures 2, 3:
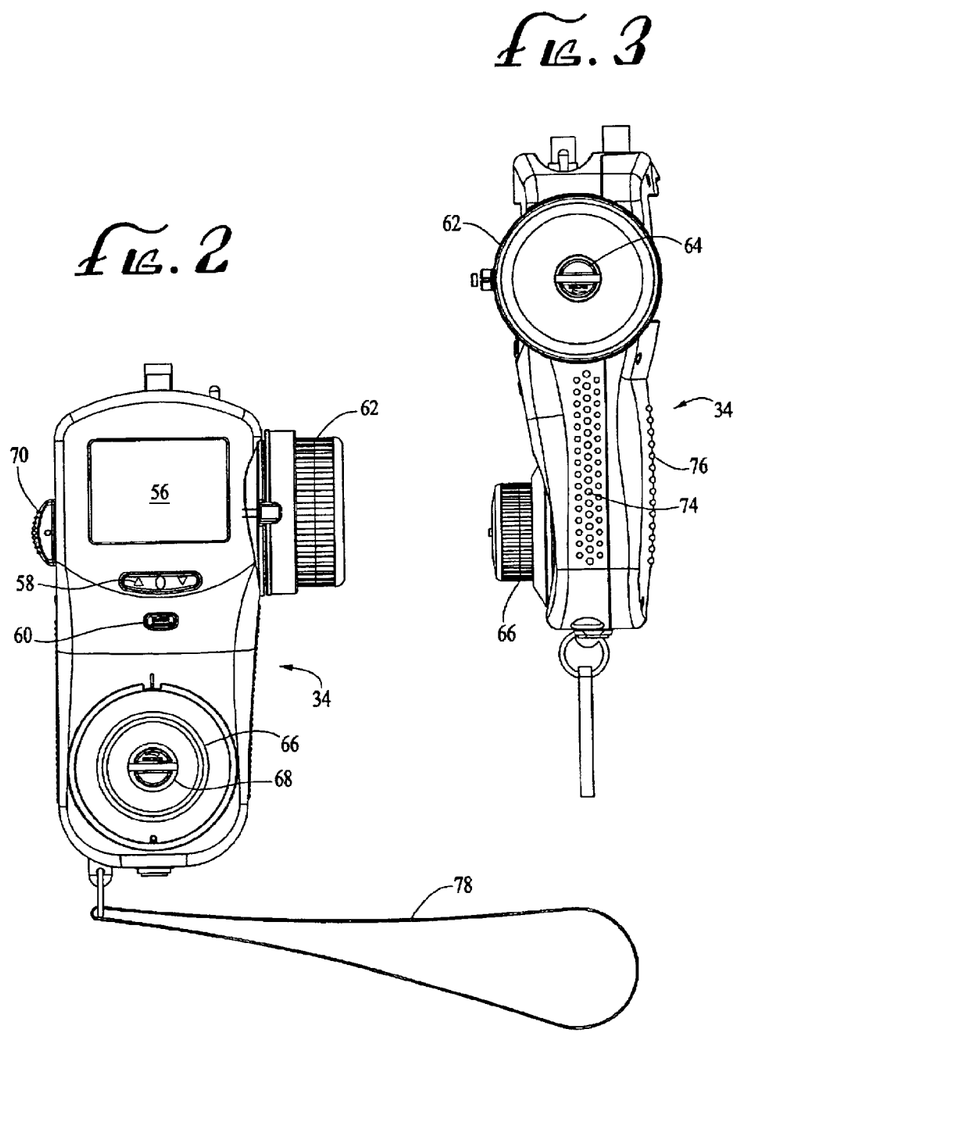
FIG. 2 is a front elevation view of the portable controller unit of the remote control system of the present invention.
FIG. 3 is a side elevation view of the remote controller unit shown in FIG. 2.
Figure 4:
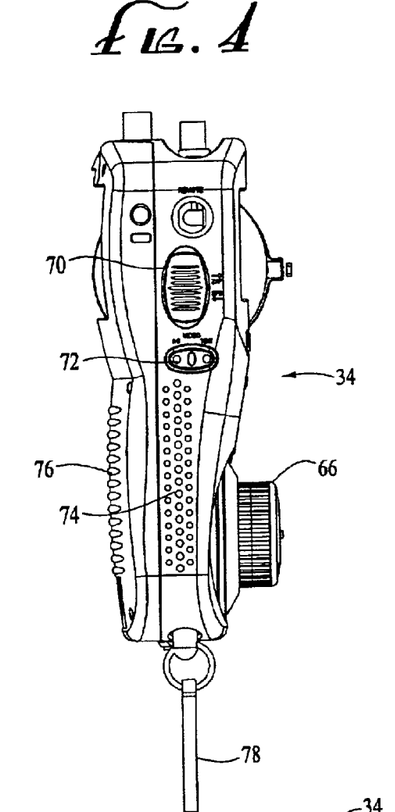
FIG. 4 is a left side elevation view of the remote controller unit shown in FIGS. 2 and 3.

Referring now to FIG. 1, a camera 10 is illustrated with a zoom-type objective lens 12 having a focus ring 14 for adjusting the focus of the lens, a zoom ring 16 for adjusting the focal length of the lens and a T-stop ring 18 for adjusting the iris of the lens in a conventional manner. If a prime lens having a fixed focal length is substituted for the zoom lens 12, then the zoom ring 16 is omitted but adjustments of the focus ring 14 and T-stop ring 18 may still be made by the remote control system of the present invention, which will readily appear to those skilled in the art. The camera 10 may be either a film or video camera of any conventional type for producing movies or other high quality productions that require the precision and features of the present invention. As a cine film camera 10, it will include various sophisticated functions, such as, variable film speed (frames per second or fps), variable shutter angle and the like, as well as a start/stop switch, that may be controlled by the remote control system of the present invention. Similarly, as a video camera 10, such as a high definition video camera, it will have various recording functions that can be controlled by the remote control system of the present invention. Thus, the remote control system of the present invention is capable of remotely controlling each of the functions of any conventional film camera or video camera (hereinafter generally referred to as a "camera") and any type of prime or zoom lens.

Zoom lens 12 may be of a conventional type having adjustment rings 14, 16 and 18 that have teeth on the outer periphery that can be engaged by a gear which is driven by a motor for adjusting the positions of those three rings. Specifically, a motor 24 with a gear drive engages focus ring 14, a motor 26 with a gear drive engages zoom ring 16, and a motor 28 with a gear drive engages T-stop ring 18, which motors are mounted on a support 20, for independently driving those three adjustment rings in response to motor drive signals. In turn, the motor drive signals provide an indication as to the exact location of the respective adjustment rings 14, 16 and 18 that is communicated to the operator, as described below, although any type of system may be used for providing an accurate reading of the location of each of the three adjustment rings which may be used with the remote control system of the present invention. Further, this invention is not limited to the use of a lens having toothed rings for adjusting the focus, focal length and/or T-stop but rather the invention is applicable to any lens adjustment system that can be driven by any convenient means rather than the motors 24, 26 and 28 with gear drives.

Thus, the lens 12 and motor drive system described above and illustrated in FIG. 1, as well as the camera 10, are merely representative of one type of camera and lens system that may be operated by the remote control system of the present invention.

The remote control system 30 of the present invention includes a digital motor driver 32 and a digital controller 34 which communicate between each other through either a hardwire connection or cable 36 or by wireless communication from a video/data transmitter 38. The motor driver 32 and controller 34 may be powered by batteries (not shown). FIG. 1 illustrates two identical digital controllers 34 with the one on the right connected by hardwire to the digital motor driver 32 and the one on the left communicating wirelessly by any convenient transmitting/receiving signal system. The video/data transmitter 38 has two separate antennas 40 and 42 for separately (1) transmitting the video signal and (2) transmitting and receiving the data signals. The digital controller 34 has a built-in antenna (not shown) and an external antenna 43 for separately transmitting and receiving data signals and separately receiving the video signal from the video/data transmitter 38. The digital motor driver unit 32 is separately connected by cables 44, 46 and 48 to the ring drive motors 24, 26 and 28, respectively, and by cable 50 to camera 10 for communicating control signals and data to and from the control motor driver unit 32.

Figure 5:
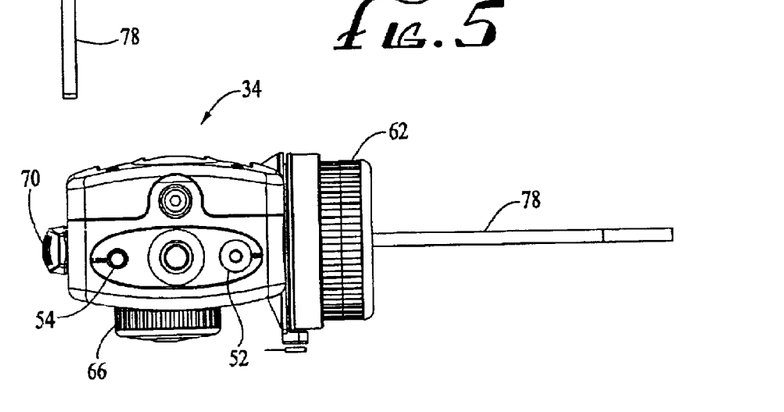
FIG. 5 is a top view of the remote controller unit shown in FIGS. 2–4.

Referring now to FIGS. 2–5, the digital controller 34 includes switches, buttons and knobs, generically referred to as "control means", for controlling each of the functions of the camera 10 and lens 12 simply by the operator manually manipulating those control means. For example, as shown in FIG. 5, on the top of the controller 34 there is included an on/off button 52 for starting and stopping the camera and a lens calibration button 54, which has several functions as described hereinafter. The controller 34 includes a large display screen 56, up/down menu and cursor control buttons 58 and an enter button 60 on the front (see FIG. 2) which are used for selectively displaying menus and data. A large focus knob 62 is provided on the side of controller 34 for controlling the focus of lens 12 by controlling the operation of the focus drive motor 24 for rotating the focus ring 14 of the lens. The focus knob 62 may be provided with a friction adjustment knob 64 for the operator to adjust the force required to rotate the focus knob 62. A T-stop adjustment knob 66 is provided on the front of controller 34 for controlling the T-stop drive motor 28 and rotation of T-stop ring 18. T-stop adjustment knob 66 also includes a friction adjustment knob 68. The controller 34 is also provided with a lens zoom adjustment switch 70 for controlling the zoom drive motor 26 and the position of the zoom ring 16, such as by pushing the switch up or down for changing the focal length between telephoto and wide angle. Also, by pushing the zoom switch 70 laterally the speed of the change in focal length may be controlled. A toggle switch 72 is also provided on the left side of the controller 34 for switching the display on screen 56 between a video display and a data or text display (see FIG. 4). Moreover, by actuating the toggle switch 72 in the direction of the video display, i.e. to the left in FIG. 4, a second time a second video signal will be displayed on screen 56, as described below with respect to FIGS. 6 and 7.

The digital controller 34 also is provided with hand-gripping surfaces 74 and 76 on the sides and back, respectively, at the lower half of the unit for the operator to comfortably grip the controller 34 in the palm of one hand (preferably the left hand for the orientation of the control means shown in the figures) and operate some of the control means with the gripping hand while operating other of the control means with the free hand. For example, the zoom button 70 and the toggle switch 72 are conveniently operated by the thumb of the gripping left hand while the fingers grip the controller. Further, the focus knob 62 and T-stop knob 66 are conveniently operated by the free right hand of the operator. Of course, the controller 34 can be made with the control means on the opposite sides of the controller 34 for more convenient operation by a left-handed person. Similarly, the camera on/off button 52, calibration button 54, up/down and cursor control buttons 58 and enter button 60 may be conveniently operated by the free-hand of the operator, all without releasing the grip on the controller 34. A wrist strap 78 also is provided for supporting the controller 34 on the wrist of the gripping hand when the operator wishes to release the hand gripping of the controller.

Thus, it may be seen that each and every function of the camera 10 and lens 12 may be conveniently controlled by the digital controller 34 by the operator manipulating the various control means and that the controller 34 is portable for unrestricted movement by the operator, whereby the operator can assume the most convenient and/or advantageous position for viewing the scene being photographed and controlling the camera and lens while doing so. This unrestricted movement of the operator is enhanced by using the wireless mode, such as, shown by the digital controller 34 to the left in FIG. 1 but even if a hardwire cable 36 connection to the controller 34 is used, as shown by the controller to the right in FIG. 1, the operator's movement is only restricted by the length and manipulation of the hardwire cable 36.

Cine film cameras for producing movies and high quality productions normally include a video camera as part of its optical system for supplying a video signal to a monitor, viewfinder or the like in addition to recording the scene on film and it is this video signal that is provided to the digital motor driver unit 32 and, in turn, to the digital controller 34 for displaying on screen 56. Of course, when a high definition video camera is being used for recording the movie or other high quality production, then that video signal is also supplied to the transmitter 38 and in turn to the controller 34 for displaying on screen 56. Since the video signal in either case is of the scene actually being recorded by the camera 10 through the lens 12, the scene being displayed on screen 56 is of the highest quality and accurately depicts the scene being recorded by that camera.

Figure 6:
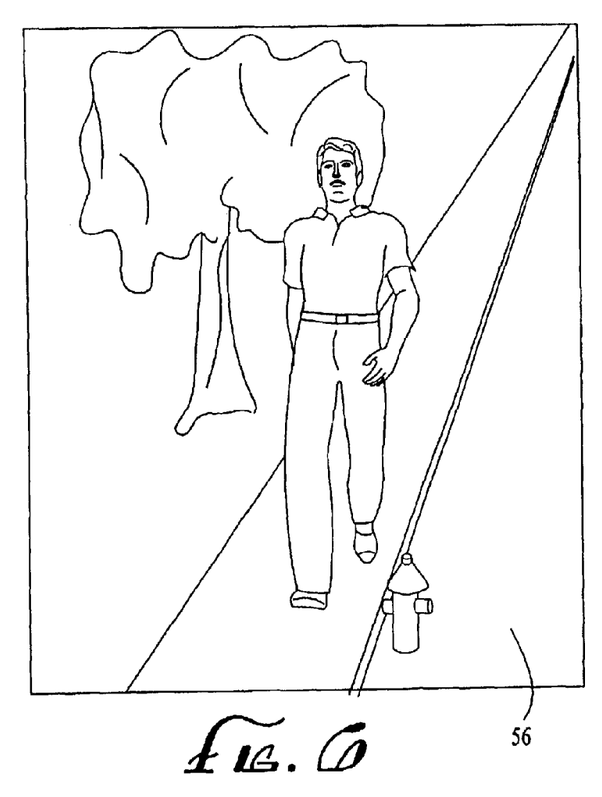
FIGS. 6 and 7 are illustrations of a single scene as viewed from two different cameras simultaneously, which scenes may be displayed on the screen of the remote controller unit shown in FIGS. 2–5.
Figure 7:
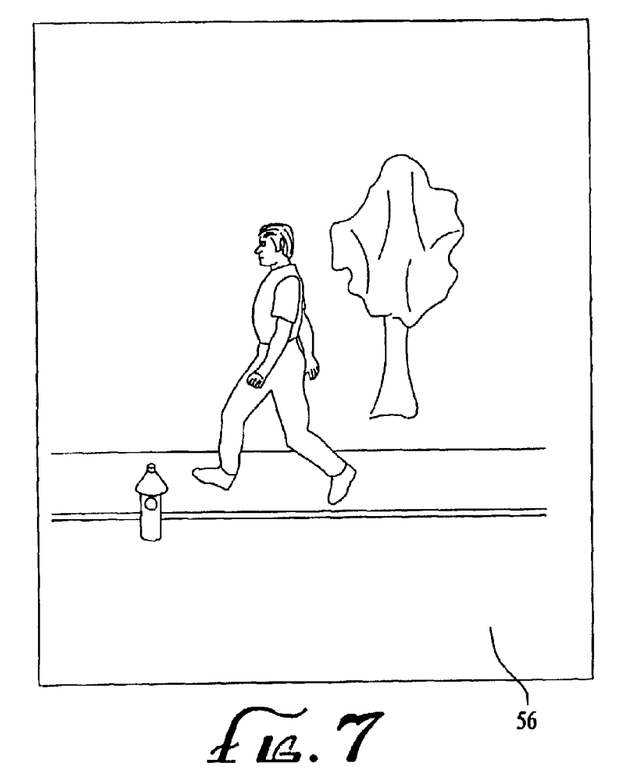

Referring now to FIGS. 6 and 7, examples are shown of the same scene viewed simultaneously by two separate cameras at two different locations and displayed alternately on screen 56. For example, the camera recording the scene shown in FIG. 6 is in front of the walking man while the camera recording the scene shown in FIG. 7 is to one side of the walking man, which is a typical example of an arrangement of cameras for recording a scene from different viewpoints for subsequently incorporating scenes from different viewpoints in the movie, if desired. As previously noted, the digital controller 34 is provided with a video source selection control means, namely, the toggle switch 72, whereby the scene of FIG. 6 from one camera can be selectively displayed on display screen 56 of the controller and then by manipulating toggle switch 72 the scene shown in FIG. 7 can be displayed on screen 56 without interrupting any other functions of the controller 34 motor driver unit 32, camera 10 or lens 12. The scenes of FIGS. 6 and 7 displayed on screen 56 are sufficiently large and clear for the operator to select and make any adjustments of the cameras or lenses for which that operator of controller 34 is responsible. For example, as the man shown in FIGS. 6 and 7 walks toward the camera recording the scene of FIG. 6, the focus of lens 12 must be changed but, on the other hand, since the man is walking laterally with respect to the camera recording the scene of FIG. 7, the focus probably does not require any immediate adjustment. On the other hand, the scene may be changing, by someone approaching the man whereby it becomes desirable to change the zoom (focal length) of the camera recording the scene of FIG. 7 to include the approaching person, which zoom adjustment may be made by the operator manipulating the zoom switch 70. Lines or other indicia (not shown) may be provided on the display screen 56 for indicating the outline or format of the film or video whereby the operator can immediately visualize what portion of the total scene is being recorded or will be reproducible in a specific format. Thus, it may be seen that the operator of the digital controller 34 not only has the ability to control all of the functions of the camera 10 and lens 12 but the operator has the scene displayed on screen 56 for continually evaluating the progress of the scene from two separate cameras. Of course, where desirable, the controller 34 may be adapted to receive a video signal from more than two cameras and control the functions of more than two cameras and lenses. However, normally each operator will be assigned to control all or only a portion of a single camera and lens combination to enhance the quality of that control during the filming of a scene, although a person may have the ability to control several cameras during rehearsal of a scene for developing the optimum combination of scenes being recorded.

When the hardwire cable 36 is used to connect the controller 34 to motor driver unit 32 through the video/data transmitter unit 38 (which serves as a transceiver), the signals are multiplexed/combined and transmitted through a single coaxial cable and then demultiplexed/decombined by the controller 34. For example, in order to obtain all of the data, control and video functions described above, the video/data transceiver unit 38 takes up to three (3) RS232 signals (through a 2.4 GHz transceiver) and two (2) video signals (through a 900 MHz transmitter) for the two video scenes (such as FIGS. 6 and 7) selectable by buttons 72 and combines them with power to multiplex the signals and send them to controller 34 where the signals are demultiplexed. Electrical power, data processing, programming and memory are provided with motor driver unit 32, video/data transmitter unit 38 and controller 34 for accomplishing this multiplexing/demultiplexing and the other functions described herein.

Figure 8:
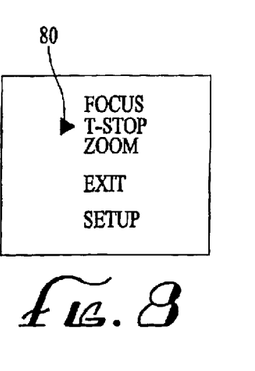
FIGS. 8–22 are illustrations of the multiplicity of different data and programming displays that may be selectively displayed on the screen of the portable controller unit shown in FIGS. 2–5.
Figure 9:
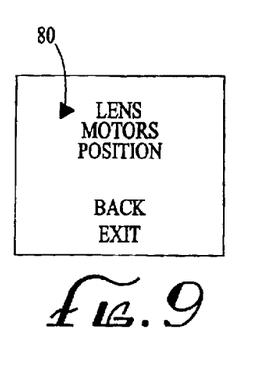
Figure 10:
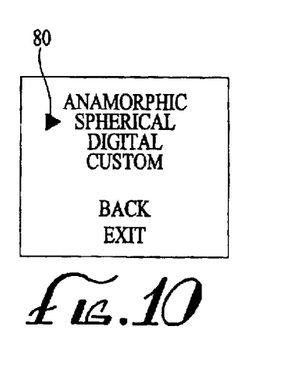
Figure 11:
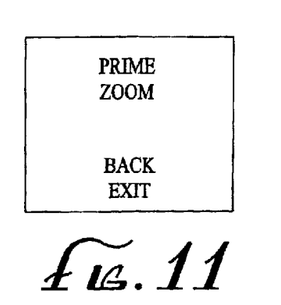
Figure 12:
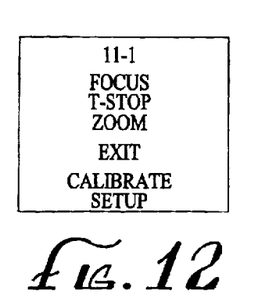
Figure 13:
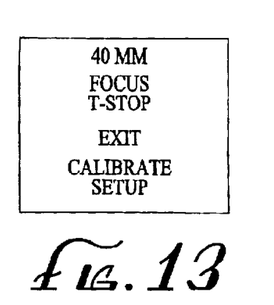

FIGS. 8–21 illustrates a variety of menu and data displays that may be selected for the screen 56 by manipulating the various control means. These figures are provided as representative examples of the versatility of the present system without attempting to be exhaustive of all of the possible menus and data displays. For example, FIG. 8 is a display of the basic menu for starting the calibration of the lens 12 when a new lens is installed on the camera 10 or when all of the lenses intended for use on the camera 10 are being calibrated in preparation for the production. The menu in FIG. 8 is obtained by activating the calibration button 54 and then the specific function required is selected by using the up/down buttons 58 to move the cursor 80 up and down to select the function being calibrated. For example, in FIG. 8 the cursor 80 has been moved to a location adjacent "T-STOP" for calibrating the T-stop of that lens 12. The calibration is continued by pushing the enter button 60 and then actuating the calibration button 54 again while turning the T-stop knob 66 to one extreme position, releasing the calibration button 54, pushing the calibration button 54 again, turning the T-stop knob 66 to the other extreme position and again releasing the calibration button, whereby the T-stop adjustments of that lens 12 are calibrated in the memory of the remote control system 30. By again using the up/down button 58, a different function, such as "FOCUS" or "ZOOM" may be selected and the calibration of those functions performed in the same manner.

On the other hand, if the lens 12 is one for which the lens data has previously been entered into the memory of the remote control system 30, the calibration can be accomplished by identifying that lens as shown in FIGS. 9–13. First, the cursor 80 is moved to a position opposite "SETUP" shown in FIG. 8 and the enter button 60 pushed, which will then cause the menu of FIG. 9 to be displayed. Next, the cursor 80 is moved to a position opposite "LENS" and the enter button 60 is actuated to display the menu illustrated in FIG. 10 whereupon, for example, the cursor 80 is moved to a position identifying the lens as "SPHERICAL" which is then entered. This causes the menu of FIG. 11 to be displayed and the operator selects between "PRIME" and "ZOOM". Assuming the operator selects "ZOOM" by using the cursor 80, the menu of FIG. 12, for example, will appear identifying the zoom lens as "11-1". On the other hand, if the operator selected "PRIME" from the menu of FIG. 11, the menu of FIG. 13, for example, will appear and identify the lens as "40 MM" as a prime lens having a focal length of 40 mm. Fine-tuning of the lens calibration may then proceed by selecting "CALIBRATE" from the menu of FIG. 12 or FIG. 13. Other useful information and data concerning each of the lenses may be entered and retained in the memory of the remote control system, such as the serial number of that lens. Thereafter, when the remote control system 30 is used with that lens, then the lens merely needs to be identified when it is installed on the camera.

Figure 14:
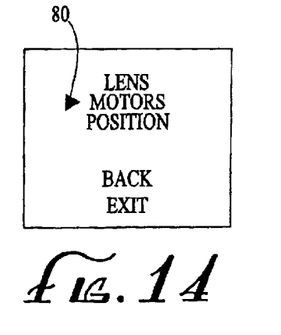
Figure 15:
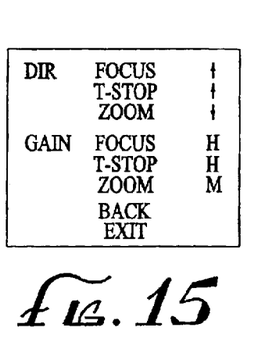

Referring now to FIGS. 14 and 15, the manner in which the lens drives motors 24, 26 and 28 are controlled and modified is illustrated. The menu of FIG. 14 is displayed on screen 56 by entering "SETUP" from the basic menu illustrated in FIG. 8 and then the cursor 80 is moved to a position adjacent "MOTORS" (rather than "LENS" as in FIG. 9) and entered by button 60, which causes the menu of FIG. 15 to be displayed. The direction of rotation of each of the three motors based on the direction of movement of the control knobs 62, 66 and control switch 70 may be selected by selecting "FOCUS" "T-STOP" or "ZOOM" adjacent the heading "DIR" (direction), such as by a cursor or highlighting, and then using the up/down buttons 58 to select either clockwise or counterclockwise (up or down for switch 70) and then pushing the enter button 60. Thus, for example, the operation of the focus knob 62 may be selected such that clockwise rotation increases the focus distance or conversely that clockwise rotation decreases the focus distance of the lens 12, whichever is more comfortable or normal for the operator. Then by highlighting or otherwise selecting "FOCUS" "T-STOP" or "ZOOM" under the heading "GAIN" the gain for controlling the operation of the selected motor drive 24, 26 or 28 may be chosen as High (H), Medium (M) or Low (L) and entered by pushing the enter button 60. Thus, the operation of the control of the motors driving the adjustment rings of the lens 12 can be adapted to the personal preferences of the operator.

Figure 16:
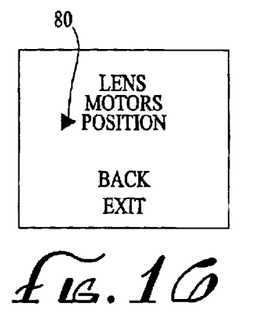
Figure 17:
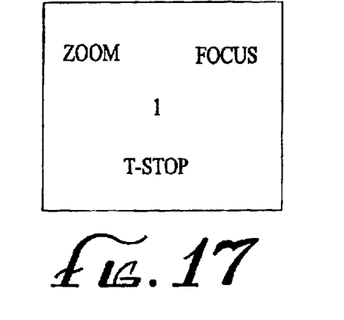
Figure 18:
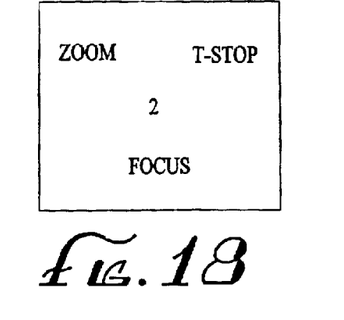

Referring now to FIGS. 16–18, a method by which the location of the lens control means on the digital controller 34 is disclosed. Again, starting with the basic menu shown in FIG. 8, the term "SETUP" is selected and entered to provide the next menu of FIG. 16 (the same as FIGS. 9 and 14) and the cursor 80 is moved to a position adjacent "POSITION" which is then entered by pressing button 60. The first display of "position" shown on screen 56 is illustrated in FIG. 17 as the "1" (shown in the center of the screen) position and provides a display of the locations of the control means as viewed from the front of the controller 34, i.e. as viewed in FIG. 2. Specifically, the "ZOOM" control is at the upper left hand portion of the controller 34 (switch 70), the "FOCUS" control is at the upper right hand portion of the controller 34 (knob 62), and the "T-STOP" control is at the bottom of the front of the controller 34 (knob 66). This is the same arrangement of the control means (62, 66 and 70) and functions described above and the controller 34 will "default" to this arrangement if no changes are made. However, by using the up/down button 58, the display on screen 56 will be scrolled to successive positions ("2" through "6") illustrating the six difference orientations of the three control means that are possible. For example, FIG. 18 illustrates the second or "2" orientation where the "ZOOM" remains in the upper left hand location but the "FOCUS" and "T-STOP" controls have been reversed from the "1" orientation of FIG. 17 whereby knob 62 on the upper right hand portion of the controller 34 becomes the T-stop adjustment control means and knob 66 on the lower front of the controller 34 becomes the focus control means. Similarly, orientation positions "3" through "6" (not shown) allow the locations of the control means for each of the three drive motors 24, 26 and 28 to be changed to each of the three locations to suit the personal preference of the operator or the particular type of adjustments that may be required for filming a particular scene. For example, if there is going to be no change in the T-stop or focus of the lens 12 because the subject is not moving, and yet it is desirable to zoom the lens then the "ZOOM" control might be more comfortably handled by knob 62 on the upper right hand side of controller 34 and this can be accomplished by selecting the appropriate orientation position "3" through "6".

Figure 19:
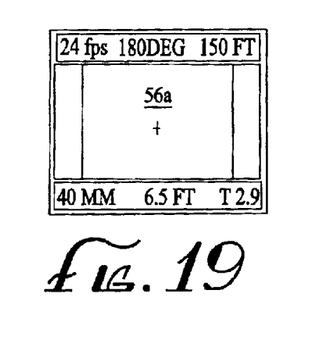

Referring now to FIG. 19, another versatile aspect of the present invention is illustrated wherein data can be displayed on the screen 56 simultaneously with the photographed scene (not shown) being displayed in the central portion 56a of the screen 56. Specifically, for example, the film speed (24 fps) may be displayed in the upper left hand portion, the shutter angle (180 DEG) may be displayed in the center upper portion, the remaining film (150 FT) in the magazine may be displayed in the upper right hand portion, the type of lens (40 MM) displayed in the lower left hand corner, the focus distance (6.5 FT) displayed in the center bottom portion, and the T-stop setting (T 2.9) displayed in the lower right hand portion. Simultaneously the scene being photographed, such as shown in FIGS. 6 and 7, may be shown in a reduced size in the central portion 56a of the display screen 56.

Figure 20:
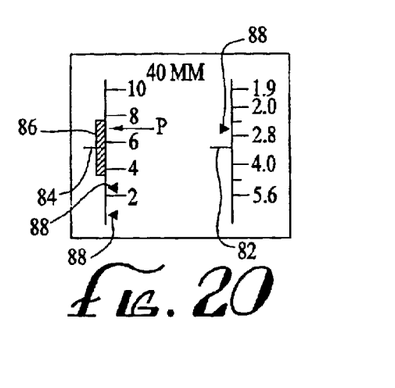

FIG. 20 illustrates another display feature of the present invention wherein, for example, for a specific lens 12 (here 40 MM) and a selected T-stop setting (here about 2.9 as shown by the index line 82 on the right hand scale), the correct focus distance (here about 5.9 feet as shown by the index line 84 on the left hand scale) is shown graphically. Similarly, the depth of field may be displayed graphically by a vertical bar 86 and a measured "camera-to-object distance by an arrow P" on the focus distance scale at the right hand side of FIG. 20. Moreover, the operator has the ability to input additional markers, such as triangles 88 or the like, at any desired location to post information that the operator may wish to use. The markers may be of different shapes, colors, sizes or the like selected by the operator for various purposes. Further, the data set forth at the top and bottom of FIG. 19 may be displayed on the screen of FIG. 20. Again, this provides the operator with all the desired information instantly merely by selecting the appropriate display for the screen 56.

Figure 21:
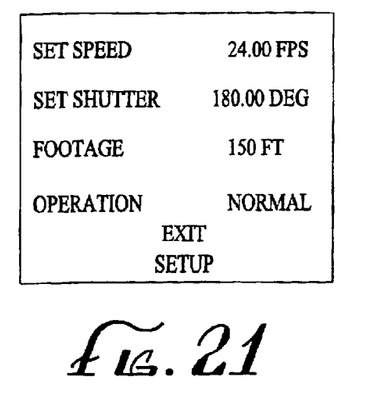
Figure 22:
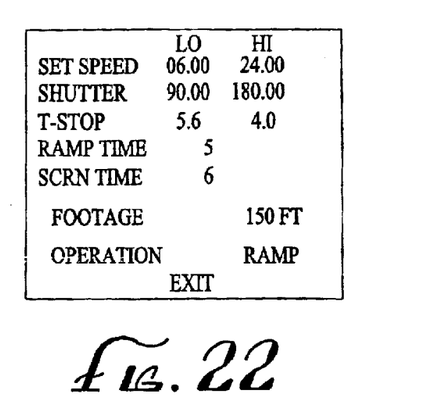

FIGS. 21 and 22 illustrate displays on the screen 56 for determining the operation of the camera 10 when, for example, the camera is a film camera with adjustable film speed, shutter setting and ramp techniques. FIG. 21 shows a "NORMAL" operation with a relatively conventional film speed of 24 FPS and shutter setting of 180 DEG. If it is desired to increase the film speed, such as to produce a slow motion projection of the recorded scene, the up/down button 58 can be used to highlight "SET SPEED" to then increase (or decrease) the film speed, and to enter that changed film speed by pushing enter button 60. By selecting the menu shown in FIG. 22, various ramp techniques may be employed wherein the film speed, shutter angle and T-stop may be set to "LO" and "HI" values and the "RAMP TIME" and the "SCRN TIME" may be set to achieve the desired filming effects. Similarly, other functions of the camera and lens may be accomplished automatically, such as the zoom speed.

Although specific arrangements of the components and controls of the remote control system of the present invention have been illustrated and described in detail, it will readily appear to those skilled in the art that numerous modifications can be made to the disclosed embodiments without departing from the scope of the present invention as defined by the following claims.

It is claimed:

1. A system for remotely controlling the operation of a camera having a video signal tap and a lens including the operation of at least a start/stop switch of the camera and lens focus and T-stop adjustment motors of the lens, comprising:

a motor driver unit for connection to and controlling of the camera start/stop switch and the lens motors;

a controller having means for selectively connecting to said motor driver unit by hardwire or wireless for communicating between said motor driver unit and said controller, said controller being portable and sized for holding by an operator in one hand;

said controller having separate control means manually operable by the operator for operating the motor driver unit to separately and independently control at least the camera start/stop switch and the lens motors; and     said controller having a display screen and means for selectively displaying either a scene from the video signal tap of the camera or a plurality of lens data concerning at least the lens focus adjustment and lens T-stop adjustment.

2. The remote control system of claim 1, wherein said controller includes means for selectively displaying on said display screen a scene from a video signal tap of a second camera.

3. The remote control system of claim 2, further including a second motor driver unit for connection to and controlling of a start/stop switch of the second camera and lens focus and T-stop adjustment motors for a lens on the second camera.

4. The remote control system of claim 1 or 2, further including a second controller for also selectively connecting to said motor driver unit and having duplicate said control means, display screen and means for selectively displaying either a scene or a plurality of lens data concerning at least the lens focus adjustment and the lens T-stop adjustment.

5. The remote control system of claim 1, wherein separate control means comprise a first rotatable knob on a front of said controller and a second rotatable knob on a side of said controller for controlling said focus and T-stop adjustment motors of the lens.

6. The remote control system of claim 5, wherein said controller includes means for selecting which of said first and second rotatable knobs controls which of said lens motors.

7. The remote control system of claim 1, further including a transmitter/receiver unit connected to said motor driver unit for transmitting said video signal and for transmitting and receiving data signals concerning said lens motors.

8. The remote control system of claim 1, further including a cable connecting said motor driver unit to said controller.

9. The remote control system of claim 1, wherein said controller includes means for simultaneously displaying on said screen the scene and the lens data.

10. The remote control system of claim 9, wherein the scene is displayed centrally on said screen and the lens data is displayed adjacent the edges of said screen.

11. A system for remotely controlling the operation of a camera having a video signal tap and a lens including the operation of at least a start/stop switch of the camera and lens focus and T-stop adjustment motors of the lens, comprising:

a motor driver unit for connection to and controlling of the camera start/stop switch and the lens motors;

a controller having means for selectively connecting to said motor driver unit by hardwire or wireless for communicating between said motor driver unit and said controller, said controller being portable and sized for holding by an operator in one hand;

said controller having separate control means manually operable by the operator for operating the motor driver unit to separately and independently control at least the camera start/stop switch and the lens motors;

said controller having a display screen and means for selectively displaying either a scene from the video signal tap of the camera or a plurality of lens data concerning the lens; and said controller and motor driver unit having memory and processing means for selective operation with a plurality of different cameras and lenses, said controller having means for entering an identification of the camera and lens currently being used into said memory and processing means, and said memory and processing means functioning to calibrate that currently used lens to said controller and motor driver unit.

12. The remote control system of claim 11, wherein said controller includes means for selectively displaying on said display screen a scene from a video signal tap of a second camera.

13. The remote control system of claim 12, further including a second motor driver unit for connection to and controlling of a start/stop switch of the second camera and lens focus and T-stop adjustment motors for a lens on the second camera.

14. The remote control system of claim 11 or 12, further including a second controller for also selectively connecting to said motor driver unit and having duplicate said control means, display screen and means for selectively displaying either a scene or a plurality of lens data concerning at least the lens focus adjustment and the lens T-stop adjustment.

15. The remote control system of claim 11, wherein separate control means comprise a first rotatable knob on a front of said controller and a second rotatable knob on a side of said controller for controlling said focus and T-stop adjustment motors of the lens.

16. The remote control system of claim 15, wherein said controller includes means for selecting which of said first and second rotatable knobs controls which of said lens motors.

17. The remote control system of claim 11, further including a transmitter/receiver unit connected to said motor driver unit for transmitting said video signal and for transmitting and receiving data signals concerning said lens motors.

18. The remote control system of claim 11, further including a cable connecting said motor driver unit to said controller.

19. The remote control system of claim 11, wherein said controller includes means for simultaneously displaying on said screen the scene and the lens data.

20. The remote control system of claim 19, wherein the scene is displayed centrally on said screen and the lens data is displayed adjacent the edges of said screen.

21. The remote control system of claim 11, wherein said memory and processing means function to calibrate the lens motor adjustments by recording in the memory an extreme maximum and an extreme minimum adjustment positions achieved by the lens motors.

22. The remote control system of claim 1 or 11, wherein said motor driver unit includes a means for connection to and controlling of a zoom lens focal length adjustment motor of the lens.

23. The remote control system of claim 22, wherein said controller includes control means for separately controlling the zoom lens focal length adjustment motor.

24. The remote control system of claim 23, wherein said controller includes means for setting and controlling the rate of change of the focal length adjustment.

25. The remote control system of claim 11, wherein said motor driver unit is connected to said controller through a video/data transmitter unit and a cable, and means are provided for multiplexing data, control signals and video signals communicated through said cable between said motor driver unit and said controller and demultiplexing said data, control signals and video signals when received.

26. The remote control system of claim 1, wherein the lens data is displayed graphically on the display screen and arranged in a logical juxtaposition with respect to one another.

27. The remote control system of claim 11, wherein the lens data is displayed graphically on the display screen and arranged in a logical juxtaposition with respect to one another.

28. In a system for remotely controlling a start/stop switch and one or more lens motors of a camera having a video signal tap and a lens, the camera further including a motor driver unit for controlling the start/stop switch and the one or more lens motors, a handheld controller communicatively couplable to the motor driver unit, the controller comprising:

separate controls manually operable by the operator for operating the motor driver unit to separately and independently control at least the start/stop switch and the lens motors; and a display screen for selectively displaying either a scene from the video signal tap or a plurality of lens data concerning one or more lens adjustments.

29. The controller as recited in claim 28, the display screen for selectively displaying a scene from a video signal tap of a second camera.

30. The controller as recited in claim 29, wherein the controller is communicatively couplable to a motor driver unit of the second camera for controlling a start/stop switch and one or more lens motors for a lens on the second camera.

31. The controller as recited in claim 28, the separate controls comprising a first rotatable knob on a front of the controller and a second rotatable knob on a side of the controller for controlling the lens motors.

32. The controller as recited in claim 31, wherein the controller is programmable for selectively assigning particular lens motors to the first and second rotatable knobs.

33. The controller as recited in claim 28, further comprising a wireless transmitter/receiver unit for receiving a video signal from the motor driver unit and for transmitting and receiving control and lens data signals concerning the lens motors.

34. The controller as recited in claim 28, further comprising a cable connector for receiving a video signal from the motor driver unit and for transmitting and receiving control and lens data signals concerning the lens motors.

35. The controller as recited in claim 28, the display screen for simultaneously displaying the scene and the lens data.

36. The controller as recited in claim 35, wherein the scene is displayed centrally on the screen and the lens data is displayed adjacent the edges of the screen.

37. The controller as recited in claim 28, wherein the lens data is displayed graphically on the display screen and arranged in a logical juxtaposition with respect to one another.

* * * * *